Oct. 6, 1931.  W. G. LAIRD  1,825,962

GASKET

Filed July 30, 1927

Inventor

Patented Oct. 6, 1931

1,825,962

UNITED STATES PATENT OFFICE

WILBUR G. LAIRD, OF NEW YORK, N. Y.

GASKET

Application filed July 30, 1927. Serial No. 209,420.

This invention relates to gaskets and more particularly to metallic gaskets which are adapted for providing tight joints for pipe connections, flanged unions and the like, and is particularly adaptable for use in handling high pressure and/or high temperature fluids.

Whenever two pieces of metal are to be bolted together in a manner to form a tight joint such as in the joining of pipe flanges, fittings, valves and the like, it is customary to employ some kind of gasket material between the opposing faces of the pieces of metal in order to insure a tight joint. Ground joints are used to a very large extent in unions of small sizes, but in the larger flange fittings the use of gaskets is almost universal.

Flat gaskets cut from sheets of composition material such as rubber, asbestos, etc. are used very largely in comparatively low pressure work, while the softer metals either in sheet form or applied with a tongue and grooved joint are used in high pressure and high temperature work. In high pressure hot oil work the metallic ring squeezed into a V shaped groove is a popular type. The sliding action in the V groove tends to shear off the edges of the gasket or to cut a shoulder in the V groove which makes it more difficult to make a tight joint, than with a gasket of a type which does not slide or form shoulders or irregularities on the flanged surfaces. In substantially all of the metal gaskets now in use the gasket when applied between the opposing surfaces of the flanges takes the form of the flange surface and the pressure which can be applied in making up the joint is the sum of the tension of the bolts used in drawing the flanges together. Therefore if a tight joint is to be maintained in high pressure and high temperature work extra heavy flanges and bolts must be used.

The primary object of the present invention is to provide a gasket of hard material for making tight joints for holding high pressure fluids.

Another object of the invention is to provide a gasket which can be inserted between flanges that are machined in a duplicate manner and therefore are interchangeable.
Another object of the invention is to provide a gasket for high pressure and/or high temperature work which can be used with flanges that do not have accurately finished surfaces so as to give a tight joint even with inequalities in the flange faces and without placing undue strain on the flanges and bolts.

Another object of the invention is to provide a type of gasket that will result in a pressure being exerted against the flange faces greater than the sum of the tensions of the flange bolts which draw the flanges together.

Another object of the invention is to provide a gasket that can be applied to all ordinary types of flanges with the least amount of work on such flanges and with a minimum weakening of standard forms of flanges.

Another object of the invention is to provide a gasket which can be used repeatedly and be re-formed when necessary to correspond to new or old flange surfaces in different joints in succession.

With these and other objects in view the invention consists in the improved gasket and joint hereinafter specifically described and defined in the accompanying claims.

The various features of the invention are illustrated in the accompanying drawings, in which.

Figure 2:
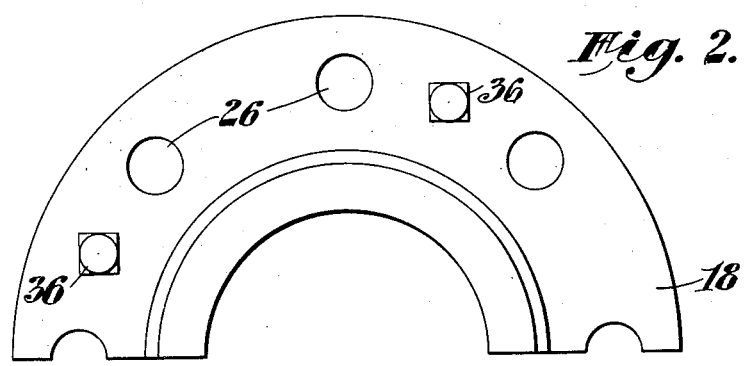
Fig. 2 is a top plan view of one-half of one of the flanges shown in Fig. 1.
Figure 1:
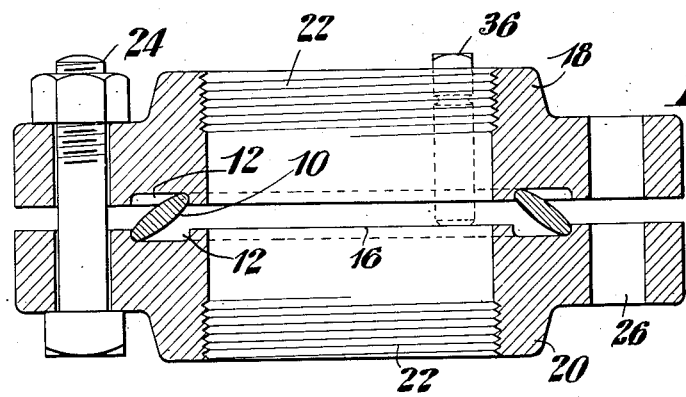
Fig. 1 is a view in vertical section showing a flange joint or ordinary flange union made up with the improved gasket of the present invention and embodying the various features of the invention.
Figure 3:
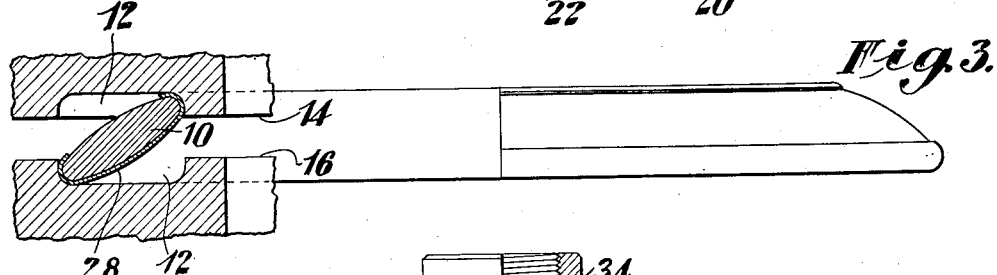
Fig. 3 is a view in vertical elevation with parts shown in section illustrating a modified form of gasket from that shown in Fig. 1; and

Referring to Figs. 1, 2 and 3 of the drawings a gasket 10 of annular frusto-conical shape is mounted in duplicate grooves 12 which are formed on the opposing faces 14 and 16 respectively of flanges 18 and 20. The flanges 18 and 20 are the usual form of pipe flanges used in making pipe connections and the only modification in these flanges in making up the joint embodying the preferred form of the invention consists in providing grooves 12 in the faces of the flanges. Each flange 18 and 20 is shown as provided with the usual thread 22 by which the flange may be connected with the pipe. A tight joint between the flanges and the gasket is made by tightening bolts 24 which are mounted in holes 26 arranged within the periphery of the flanges.

The gasket 10 is preferably made of a metal that is somewhat softer than the metal from which the flanges are formed, in order that the compression obtained by tightening the flange bolts may act to deform or squeeze the gasket material rather than the flange surfaces. This gasket may be made from a solid block of metal by turning on a lathe or may be formed from annular cylindrical rings by presses. The edges of the gasket do not need necessarily to be accurately machined but it is preferred to have the edges rounded and smooth so that they will make a good contact or joint in the grooves 12.

It is important that the grooves 12 shall have a diameter and width such that when the gasket is in position therein the inner edge of the gasket will make contact with the inner shoulder of one groove in a flange and the outer edge of the gasket will make contact with the outer shoulder in the groove in the opposing flange and when the grooves have the same width the gasket is reversible. It will be seen that the body of the gasket makes an angle with the face of the flange and when tension is placed on the bolts 24 a toggle action will be set up between the flanges and the gasket by which a very high pressure may be exerted by the edges of the gasket bearing against the shoulders of the grooves in the flanges. As the tension of the bolts tends to draw the flanges toward one another, the pressure of the gasket against the flanges tends to increase more and more with any given bolt tension. Due to the toggle action between the flanges and the gasket a greater pressure is exerted by the gasket against the shoulders of the flanges than the total sum of the tensions of the bolts which draw the flanges together.

It is preferred to make the body portion of the gasket 10 somewhat thicker than the edges of the gasket in order to obtain a beam effect and prevent buckling.

If it is desired to have the contact edges of the gasket of softer, harder or less corrosive material than the body portion of the gasket, then a suitable coating 28 may be placed around or partially around the gasket (as shown) which will enclose both its edges.

Figure 4:
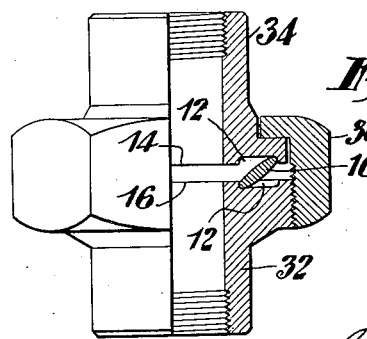
Fig. 4 is a view in vertical elevation with parts shown in section of a pipe union embodying a gasket and joint in accordance with the preferred form of the invention.

In Fig. 4 is illustrated the usual form of pipe union having the gasket 10 applied between opposing grooves 12 formed in the faces of the opposing members of the union. The members of the union are drawn together by means of a nut 30 which makes a threaded contact with the member 32 and a sliding contact with the member 34.

It is obvious that applicant's invention can be readily applied to practically all types of pipe flanges, fittings, valves and connections of practically all forms used in the industry.

The gasket is very readily adapted for all such pipe fittings because it does not require the use of male and female members or specially heavy or large flanges or connecting members.

In some cases the gasket may be used where the gasket pressure must be high and expansion or other strain on the joint is very heavy. In such cases it may be necessary to provide abutment screws 36 which are threaded through one flange and arranged to make engagement with a face of the opposing flange by which the movement of one flange relative to the other may be limited or prevented. With this means an expanding pressure which might tend to force the opposing faces of the flanges together to exert an excessive pressure on the gasket may be avoided. With the set screws 36 and bolts 24 held in tight engagement with the flanges the flange joint will move as a unit with any movement of the pipe in which the joint is mounted. It is to be understood that the phrases "shoulders in the faces"; "a shoulder on the member" or other similar phrase, as used in the claims, shall be construed to include any shoulder which is either "in" or "on" the member.

The preferred form of the invention having been thus described what is claimed as new is:

1. A pipe joint comprising connecting members having opposing faces, circular shallow grooves having substantially the same dimensions and being similarly arranged in the faces, an annular gasket having its body portion formed to make an acute angle with one face and extending from the outside shoulder of the groove on one face to the inside shoulder of the groove on the opposing face said outside edge having a considerably greater diameter than said inside edge, and means for drawing the faces toward one another.

2. A pipe joint comprising connecting members having opposing faces, circular shallow shoulders arranged in the faces, the shoulders being opposed and of unequal diameters, an annular gasket arranged to extend obliquely to the faces and having its edges in engagement with the opposing shoulders, and means for drawing the faces toward one another.

3. A pipe joint comprising connecting members having circular shallow shoulders formed in their faces, the shoulders being opposed and of unequal diameters, a frusto-conical ring gasket mounted between the faces and having its edges in engagement with the opposing shoulders and means for drawing the faces toward one another.

4. A pipe joint comprising connecting members having opposing faces, circular shallow shoulders arranged in the faces, means to draw the members toward one another, and a metal gasket having its edges in engagement with the shoulders of the opposing faces and so arranged that it will be forced against the shoulders with greater pressure than the total tension exerted in drawing the faces together.

5. A joint comprising flanges having opposing faces, grooves in the opposing faces forming shoulders therein, means to draw the faces of the flanges toward one another and an annular gasket between the faces having an edge in engagement with a shoulder on each face, the edges of the gasket in contact with the shoulders being of softer metal than the body of the gasket.

6. A joint comprising connecting members having opposing faces, circular shallow shoulders arranged in the faces, the shoulders being opposed and of unequal diameters, an annular gasket arranged to extend obliquely to the faces and having its edges in engagement with the opposing shoulders, means for drawing the faces toward one another, and means to limit the approaching movement of the faces.

7. A joint comprising connecting members having opposing faces, circular shallow shoulders formed in the faces, the shoulders being opposed and of unequal diameters, an annular gasket arranged to extend obliquely to the faces and having its edges in engagement with the opposing shoulders in the faces, said gasket being formed of metal which is harder than the metal of the faces, and means for drawing the faces toward one another.

8. A fluid-tight joint, comprising two opposing members, a frusto conical ring gasket between said members, a shoulder on each member against which an edge of the gasket abuts, and means for forcing the said members toward each other to thereby force the gasket firmly against said shoulders.

9. A fluid-tight joint, comprising two opposing metal members, a frusto conical metal ring gasket between said members, the edges of said gasket being of softer metal than that of said members, a shoulder on each member against which an edge of the gasket abuts, and means for forcing the said members toward each other to thereby force the gasket firmly against the said shoulders.

In testimony whereof I affix my signature.

WILBUR G. LAIRD.

DISCLAIMER 1,825,962.—*Wilbur G. Laird*, New York, N. Y. GASKET. Patent dated October 6, 1931. Disclaimer filed June 13, 1933, by the patentee.

Hereby disclaims from the scope of claims 1 to 4, inclusive, 6 and 8 of said Letters Patent No. 1,825,962 any pipe joint in which the "gasket" element is not permanently deformed or squeezed in completing the joint.

Your petitioner further disclaims from the scope of claim 4 of said Letters Patent No. 1,825,962 any pipe joint in which the "gasket" is not formed with rounded and smooth edges.

Your petitioner further disclaims from the scope of claims 2 and 6 of said Letters Patent 1,825,962 any pipe joint in which the gasket element is not formed of a metal which is softer than the "opposing faces" of the "connecting members".

[*Official Gazette July 11, 1933.*]